(12) United States Patent
Mori et al.

(10) Patent No.: US 6,480,318 B2
(45) Date of Patent: Nov. 12, 2002

(54) OPTICAL AMPLIFIER EVALUATION METHOD AND OPTICAL AMPLIFIER EVALUATION INSTRUMENT

(75) Inventors: Tohru Mori, Tokyo (JP); Masaru Fukushima, Tokyo (JP)

(73) Assignees: Ando Electric Co., Ltd., Tokyo (JP); Furukawa Electric Co., Ltd., Tokyo (JP)

(*) Notice: Subject to any disclaimer, the term of this patent is extended or adjusted under 35 U.S.C. 154(b) by 0 days.

(21) Appl. No.: 09/836,157

(22) Filed: Apr. 17, 2001

(65) Prior Publication Data

US 2001/0046082 A1 Nov. 29, 2001

(30) Foreign Application Priority Data

Apr. 18, 2000 (JP) .......................... 2000-117055

(51) Int. Cl.[7] .............. G02F 1/03; G02F 1/07; H04B 10/12; G01N 21/00
(52) U.S. Cl. .................. 359/264; 359/341.31; 356/73.1
(58) Field of Search ............... 324/76.36, 96; 359/117, 124, 127, 132, 138, 181, 183–184, 188, 237–239, 252, 259, 264, 278–279, 341.31, 276; 372/25, 26, 28, 33; 385/3, 5; 356/73.1

(56) References Cited

U.S. PATENT DOCUMENTS

| | | | |
|---|---|---|---|
| 5,764,605 A | * | 6/1998 | Zucker et al. ............ 369/44.29 |
| 5,933,271 A | * | 8/1999 | Waarts et al. ............ 359/341.31 |
| 5,943,162 A | * | 8/1999 | Kosaka et al. ............ 359/341.31 |
| 6,212,003 B1 | * | 4/2001 | Komazawa et al. ......... 359/341 |
| 6,236,452 B1 | * | 5/2001 | Goto et al. ............... 356/73.1 |

FOREIGN PATENT DOCUMENTS

JP          9-18391         1/1997

* cited by examiner

*Primary Examiner*—Georgia Epps
*Assistant Examiner*—William Choi
(74) *Attorney, Agent, or Firm*—Fish & Richardson P.C.

(57) ABSTRACT

In an optical amplifier evaluation instrument, a rectangular spectrum light source 1 transmits continuous light having a wide-band and flat spectrum shape, a first optical modulator 2 receives and pulse-modulates the continuous light. Further, a second optical modulator 3 operates in the same period as the first optical modulator 2 and performs the on/off pulse operation, thereby providing a sampling window in a time domain for extracting and suppressing an optical signal. A modulation signal generation section 4 performs such control and drive. An optical signal undergoing pulse intensity modulation is input to a measured optical amplifier 6. Post-amplified signal light power for each frequency component and amplified spontaneous emission power for each frequency component in a time domain in which no optical pulse signal exists are measured and operations are performed for each wavelength.

26 Claims, 15 Drawing Sheets

OPTICAL AMPLIFIER EVALUATION METHOD AND OPTICAL AMPLIFIER EVALUATION INSTRUMENT

BACKGROUND OF THE INVENTION

1. Field of the Invention

This invention relates to an optical amplifier evaluation method and an optical amplifier evaluation instrument for evaluating the gain and noise figure of an optical amplifier when the optical amplifier amplifies a wavelength multiplexed signal light beam (or frequency multiplex signal light beam) provided by multiplexing a plurality of signal light beams different in wavelength (namely, frequency) in an optical signal.

2. Description of the Related Art

First, the measuring principle and a measuring method of the gain and noise figure of an optical amplifier in an optical amplifier evaluation instrument having been used hitherto.

Gain $[G_n]$ and noise figure $[NF_n]$ when the optical amplifier amplifies a multiplex signal (WDM: Wavelength Division Multiplex) of signal light beam having one wavelength (namely, frequency) or signal light beams output by n light sources (wavelengths $\lambda_1$ to $\lambda_m$) different in wavelength (frequency) having been introduced heavily commercially in recent years are found according to expressions (3) and (4) respectively.

$$G_n = \frac{P_{out\_n} - P_{ASE\_n}}{P_{in\_n}} \quad (3)$$

$$NF_n = \frac{P_{ASE\_n}}{h \cdot \nu_n G_n \cdot \nu_n} + \frac{1}{G_n} \quad (4)$$

where n is 1 to m.

$[P_{in\_n}]$ is light power of signal light beam input to the optical amplifier, $[P_{out\_n}]$ is output light power of amplified signal light beam output from the optical amplifier, $[P_{ASE\_n}]$ is amplified spontaneous emission power output from the optical amplifier in the wavelength that the signal light beam has, $[\Delta\nu_n]$ is an optical signal light passage band width of a light intensity measuring instrument for measuring the amplified spontaneous emission power $[P_{ASE\_n}]$, $[\nu_n]$ is the frequency proper to the signal light beam input to the optical amplifier, and $[h]$ is a Planck's constant.

The suffix "ASE" is an abbreviation for Amplified Spontaneous Emission and refers to amplification based on a so-called spontaneous emission process in which excited atoms spontaneously emit light independently of the external effect and make a transition to any other stationary energy state.

However, to find the noise figure $[NF_n]$ using the above-mentioned expression (4), it is difficult to directly find the noise figure $[NF_n]$ because generally the output light power of amplified signal light beam $[P_{out\_n}]$ is superposed on the amplified spontaneous emission power $[P_{ASE\_n}]$ for output. Then, in a related art, the noise figure $[NF_n]$ is measured according to the following method:

The measuring method of the noise figure $[NF_n]$ in the related art will be discussed in detail.

FIG. 15 is a block diagram to show the configuration of an optical amplifier evaluation instrument and an optical amplifier evaluation method in the related art. That is, it is a diagram to describe the method of measuring the gain and noise figure of an optical amplifier in the related art. In the figure, signal light beams from light sources 101a, 101b, 101c, ..., and 101n different in wavelength (frequency) are combined by an optical combiner 102, then the resultant signal light beam is pulse-intensity-modulated by a first optical modulator 103 and is input through an input optical terminal 108 to a measured optical amplifier 107. The input signal light spectrum at this time is a wavelength multiplexed input signal light spectrum 110 shown in FIG. 16, and the first optical modulator 103 is controlled by a pulse signal [a] output from a modulation signal generation section 105.

The input signal light beam is amplified and output from the measured optical amplifier 107. Since the input signal light beam is pulse-modulated, the amplified signal light beam output undergoes a propagation delay of the measured optical amplifier 107 and is shifted in phase, but is produced in a pulse state in the same period. The above-mentioned amplified spontaneous emission is output regardless of the presence or absence of pulse. At this time, the pulse modulation period is a period sufficiently shorter than the atomic lifetime at upper level of the amplification medium of the measured optical amplifier 107 or the carrier lifetime, so that the amplified spontaneous emission (generally called "ASE") becomes an almost constant light output level regardless of whether the input signal light beam is on or off. The output light spectrum of the measured optical amplifier 107 becomes a waveform like an output light spectrum 111 shown in FIG. 16. FIG. 16 is a drawing to show the wavelength multiplexed signal light beam amplification form of the measured optical amplifier in the related art.

Output light of the measured optical amplifier 107 is input through an output optical terminal 109 to a second optical modulator 104. The second light modulator 104 is controlled by a pulse signal [b] output from the modulation signal generation section 105. The first optical modulator 103 and the second optical modulator 104 are driven in the same period and the phase of the second optical modulator 104 can be arbitrarily set in the 360-degree range based on the modulation timing of the first optical modulator 103.

First, the input optical terminal 108 and the output optical terminal 109 are previously connected directly as 108' and 109' and the light power $[P_{in\_n}]$ for each frequency $[\nu_n]$ of signal light beam input to the measured optical amplifier 107 is measured by a light intensity measuring instrument 106. The spectrum at this time is exactly as 112 in FIG. 17. FIG. 17 is a drawing to show each light power measured in the related art as spectrum display.

Next, the input optical terminal 108 and the output optical terminal 109 are connected to the measured optical amplifier 107 and the light power $[P_{out\_n}]$ of the amplified signal light beam output from the measured optical amplifier 107 is measured for each frequency. The spectrum at this time is exactly as 113 in FIG. 17. The phases of the first optical modulator 103 and the second optical modulator 104 are the relationship between A (modulation timing of first optical modulator) and C (timing of second optical modulator when post-amplified signal light beam $[P_{out\_n}]$ is measured), and the propagation time of a waveguide of the measured optical amplifier 107 appears as a delay. FIG. 18 is a drawing to show the relative phase relationships among the first modulator, pulse light output by the measured optical amplifier, and the second modulator in the related art.

Next, the phase of the second modulator 104 is shifted 180 degrees with respect to C (timing of second optical modulator when post-amplified signal light beam $[P_{out\_n}]$ is measured) like the relationship between A (modulation timing of first optical modulator) and D (timing of second optical modulator when amplified spontaneous emission power $[P_{ASE\_n}]$ is measured), and amplified spontaneous emission power [$P_{ASE\_n}$] output by the measured optical amplifier 107 is measured for each frequency. The amplified spontaneous emission spectrum at this time is exactly as waveform 114 in FIG. 17.

The measurement values are assigned to the above-mentioned expressions (3) and (4), whereby the gain and noise figure of the measured optical amplifier 107 can be calculated and found.

FIG. 19 shows the characteristics of the gain and noise figure of the measured optical amplifier 107 at the wavelength multiplexed signal light amplification time, found by the above-mentioned calculation, namely, shows wavelength characteristic of the gain, 115, and wavelength characteristic of the noise figure, 116.

As described above, in the related art, measurement is executed as many as the number of wavelengths of the light sources multiplexed and thus the measurement result is plotted discretely on the wavelength axis. Therefore, to increase the number of plots and provide continuous data, it is necessary to provide as many light sources as required for the purpose and multiplex. Such a measuring technique is disclosed in JP-A-09-018391 already proposed by the inventor et. al.

The optical amplifier evaluation method according to the related art is very effective for evaluating the gain and noise figure for each channel in a previously fixed known single-wavelength optical signal or multiple-wavelength multiplexed optical signal. However, to evaluate an optical amplifier in multiple-wavelength multiplexed optical signal, as many light sources as the required number of wavelengths need to be provided, leading to a large-scaled and expensive evaluation instrument. The wavelength in each channel is fixed and the band for each channel of an optical combiner is also limited and it is hard to vary the wavelength in a wide range, thus it is difficult to evaluate the gain and noise figure characteristics in any desired wavelength between channels, for example, other than the wavelengths proper to the light sources provided.

To solve the problem of providing a large number of light sources, a probe method of decreasing the number of channels of the light sources input to a measured optical amplifier as compared with that under the actual operating condition and applying the homogeneous characteristic of an optical amplifier is proposed. In the probe method, measurement is executed according to the following method: The measured optical amplifier is saturated by inputting a few number of channels (one to several channels) and the same value of the total signal light power as the total light power of actually used multiplex signal light. Further, probe signal of tunable laser source or EELED, etc., is input with low input light power to such an extent that the measured optical amplifier is not affected. To input the source as the probe signal light, the probe signal light wavelength is set in accordance with each wavelength of actual WDM signal light, and output signal light power and output amplified spontaneous emission power of the measured optical amplifier in the state are measured, whereby the gain and noise figure characteristics in the actual use state are calculated.

However, in the probe method, the gain characteristic of the measured optical amplifier changes depending on the setup condition of the wavelength (namely, frequency) of signal light input to saturate the measured optical amplifier and thus it is difficult to set the optimum condition for maintaining the homogeneous characteristic. If the optical frequencies of probe signal light and signal light input to the measured optical amplifier to saturate the measured optical amplifier are brought close to each other, the gain characteristic and the noise figure characteristic change because of a spectral hole burning phenomenon; this is a problem. It is hard for the method to precisely evaluate the measured optical amplifier.

SUMMARY OF THE INVENTION

It is therefore an object of the invention to provide an optical amplifier evaluation method and an optical amplifier evaluation instrument capable of measuring the characteristic of a measured optical amplifier easily and with high accuracy without a measurement error caused by the measuring person and capable of continuously measuring noise figures of a large number of measured optical amplifiers.

To the end, according to a first aspect of the invention, pulse intensity modulation is executed for a rectangular spectrum light source for providing high-level light output having a flat characteristic at an output level in an arbitrary wavelength (namely, frequency) range of an optical signal and a rectangular spectrum shape over a wide band in a sufficiently shorter period than the atomic lifetime at an upper level of the measured optical amplifier or the carrier lifetime, the on/off state of signal light is caused to exist in a constant period and with a constant width on the time axis, and the result is input to a measured optical amplifier.

The phase of the second optical modulator is controlled, the sampling window is synchronized with a time domain in which an optical pulse signal exists, and post-amplified signal light power [$P_{out\_n}$] for each frequency component contained in the rectangular spectrum light source is measured. The sampling window is synchronized with a time domain in which an optical pulse signal does not exis, and amplified spontaneous emission power [$P_{ASE\_n}$] for each frequency component contained in the rectangular spectrum light source is measured. The noise figure of the measured optical amplifier, [$NF_n$], is computed with respect to each of the wavelengths (namely, optical frequencies) according to $$NF_n = \frac{P_{ASE\_n}}{h \cdot v_n \, G_n \cdot v_n} + \frac{1}{G_n} \qquad (5)$$

wherein a blank constant is [h], each frequency component contained in the rectangular spectrum light source undergoing the pulse modulation is [$v_n$], the gain of the measured optical amplifier at each frequency is [$G_n$], the optical signal light passage band width of a light intensity measuring instrument when the amplified spontaneous emission power [$P_{ASE\_n}$] synchronized with the time domain in which no optical pulse signal exist is measured is [$\Delta v_n$], and the sampling wavelength in a level flat portion of the rectangular spectrum light source is n=1 to m.

According to a second aspect of the invention, in the first aspect of the invention, the gain [$G_n$] at each wavelength (namely, frequency) of input signal light of the measured optical amplifier is calculated according to $$G_n = \frac{P_{out\_n} - P_{ASE\_n}}{P_{in\_n}} \qquad (6)$$

According to a third aspect of the invention, in the first or second aspect of the invention, the fluctuations of the values dependent on the input optical frequencies of the gain [$G_n$] and the noise figure [$NF_n$] of the measured optical amplifier can be found continuously with respect to a wavelength (namely, frequency) axis based on continuity of the spectrum of the wide-band rectangular spectrum light source used as the light source and slopes of the gain [$G_n$] and the noise figure [$NF_n$] at any desired wavelength (namely, frequency) can be found from the result.

According to a fourth aspect of the invention, in the first or second aspect of the invention, pulse modulation light input to the measured optical amplifier is generated by pulse-modulating the rectangular spectrum light source directly by an electric pulse signal.

Further, according to a fifth aspect of the invention, in the first or second aspect of the invention, when the output light from the rectangular shape spectrum light source is a continuous wave (generally called "CW") light, it is passed through the optical modulator (for example, optical switch) driven by an electric pulse signal for pulse modulation, and an optical pulse fed into input of the measured optical amplifier is provided.

According to a sixth aspect of the invention, in the first or second aspect of the invention, an optical modulator (for example, optical switch) driven by a repetitive pulse signal synchronized with an optical pulse signal supplied to the measured optical amplifier is used to separate two types of output light power of the post-amplified signal light power [$P_{out\_n}$] and the amplified spontaneous emission power [$P_{ASE\_n}$] continuously output in time sequence from the measured optical amplifier.

Further, according to a seventh aspect of the invention, in the first or second aspect of the invention, two types of output light power of the post-amplified signal light power [$P_{out\_n}$] and the amplified spontaneous emission power [$P_{ASE\_n}$] continuously output in time sequence from the measured optical amplifier are measured by the light intensity measuring instrument such as an optical spectrum analyzer having a gate measuring function based on timing conducts measurement.

According to an eighth aspect of the invention, in the first or second aspect of the invention, the width (that is, time) of the sampling window as the second optical modulator is turned on/off is shorter than the width or the time during which the first optical modulator is on or off and relative phase relationship such that an overlap exists in time domains preceding and following the sampling window of the second optical modulator as the first optical modulator is turned on or off is set.

Further, according to a ninth aspect of the invention, in the first or second aspect of the invention, the measured optical amplifier is a rare earth element doped optical fiber amplifier and the modulation frequency of intensity modulation light is 10 kHz or more.

According to a tenth aspect of the invention, in the first or second aspect of the invention, the measured optical amplifier is a semiconductor optical amplifier and the modulation frequency of intensity modulation light is 1 GHz or more.

Further, according to an eleventh aspect of the invention, in the first or second aspect of the invention, the optical modulator (for example, optical switch) used for pulse-modulating the signal light is an acousto-optic switch.

According to a twelfth aspect of the invention, in the first or second aspect of the invention, the optical modulator (for example, optical switch) for separating the post-amplified signal light power [$P_{out\_n}$] and the amplified spontaneous emission power [$P_{ASE\_n}$] output from the measured optical amplifier is an acousto-optic modulator.

According to a thirteenth aspect of the invention, there is provided an optical amplifier evaluation instrument comprising a control and arithmetic unit for controlling the components to realize an optical amplifier evaluation method as set forth in any one of the first to twelfth aspects of the invention, performing operations on the results detected by the light intensity measuring instrument, and calculating the gain [$G_n$] and the noise figure [$NF_n$] of the measured optical amplifier for making it possible to conduct automatic measurement.

According to a fourteenth aspect of the invention, the optical amplifier evaluation instrument as set forth in the thirteenth aspect of the invention further comprises an optical variable attenuator for varying pulse-modulated light power of the rectangular spectrum light source input to the measured optical amplifier and setting arbitrary input light power, wherein the optical variable attenuator is controlled by the control and arithmetic unit.

Further, according to a fifteenth aspect of the invention, the optical amplifier evaluation instrument as set fourth in the thirteenth or fourteenth aspect of the invention further comprises optical path switch means, wherein the optical path switch means is controlled by the control and arithmetic unit, whereby the light power for each frequency component input to the measured optical amplifier, [$P_{in\_n}$], and the post-amplified signal light power [$P_{out\_n}$], and the amplified spontaneous emission power [$P_{ASE\_n}$] output from the measured optical amplifier are measured automatically.

DETAILED DESCRIPTION OF THE PREFERRED EMBODIMENTS

Now, a description will be given in more detail of preferred embodiments of the invention with reference to the accompanying drawings.

Figure 1:
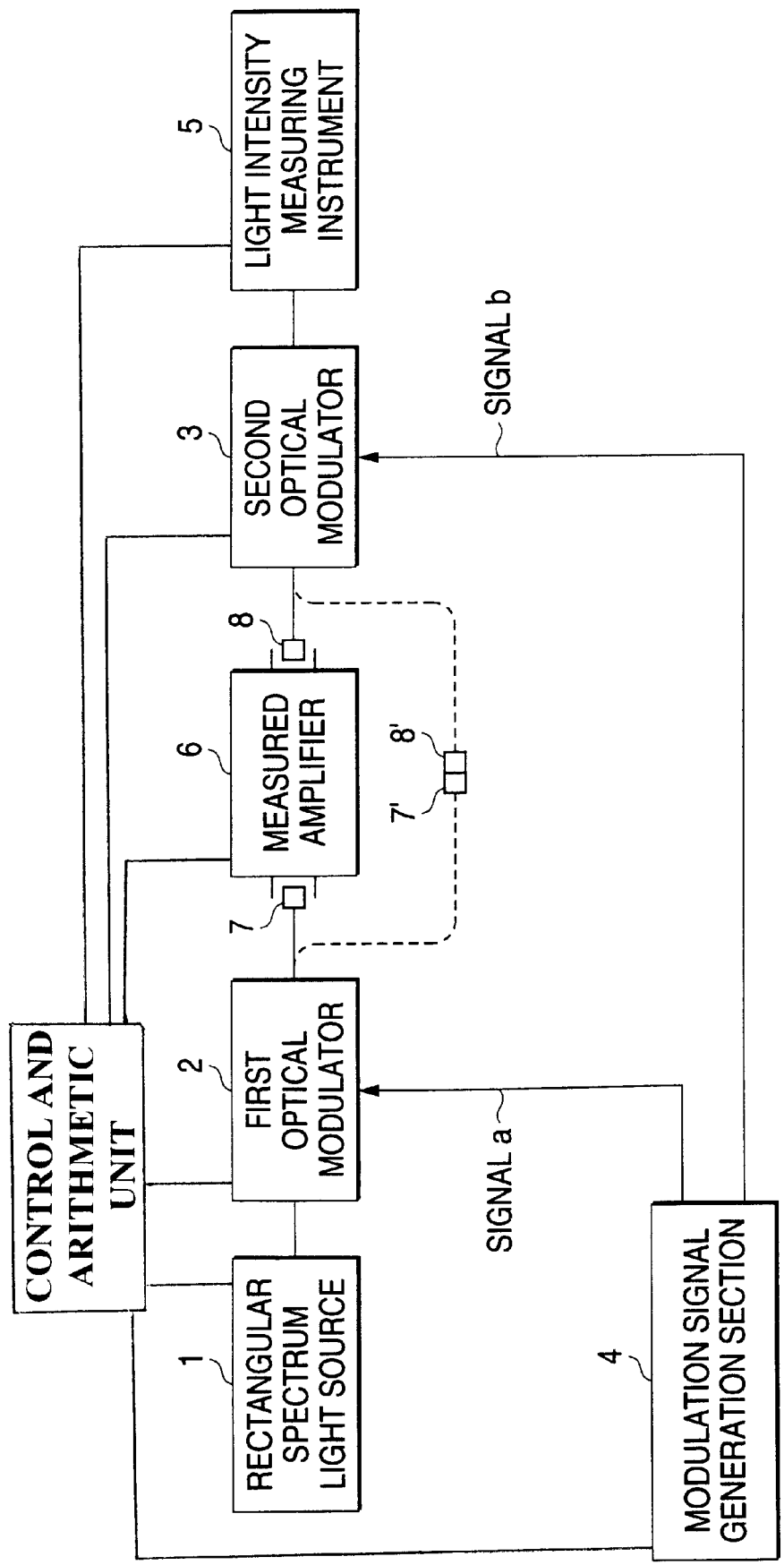
FIG. 1 is a block diagram to show the configuration of an optical amplifier evaluation instrument and an optical amplifier evaluation method common to embodiments of the invention.

First, a first embodiment of the invention will be discussed. FIG. 1 is a block diagram to show the configuration of an optical amplifier evaluation instrument and an optical amplifier evaluation method common to the embodiments of the invention. The configuration in FIG. 1 is the most fundamental and can be developed to various configurations described below.

In FIG. 1, the optical amplifier evaluation instrument comprises a rectangular spectrum light source 1 having a wide-band and flat spectrum shape, a first optical modulator 2 for pulse-modulating CW light, a second optical modulator 3 for operating in the same period as the first optical modulator 2 and performing the on/off pulse operation, thereby providing a sampling window in a time domain for extracting and suppressing an optical signal, a modulation signal generation section 4 for controlling and driving the first and second optical modulators 2 and 3, a light intensity measuring instrument 5 such as an optical spectrum analyzer, a measured optical amplifier 6 formed of an optical fiber comprising a rare earth element of erbium, etc., added, an input optical terminal 7, and an output optical terminal 8.

Figure 2:
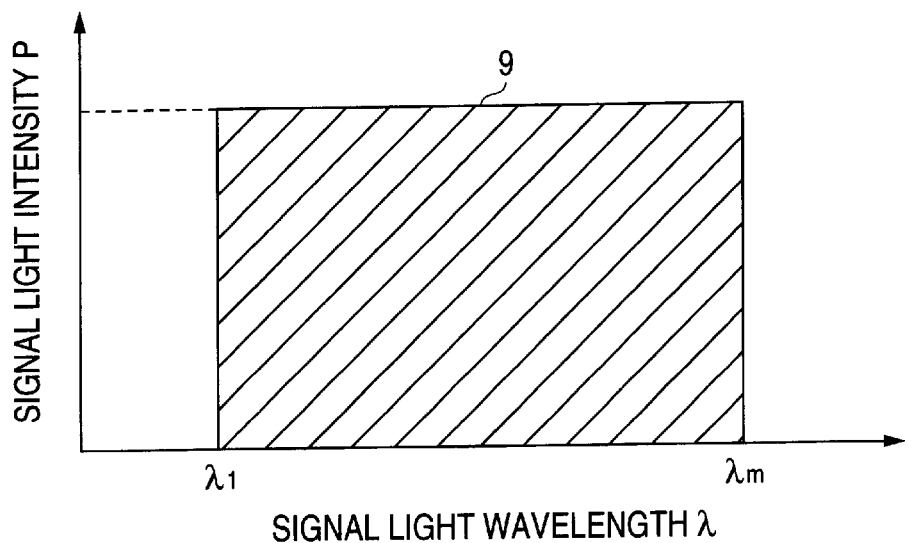
FIG. 2 is a drawing to show an ideal spectrum form output by a rectangular spectrum light source in a first embodiment of the invention.
Figure 9:
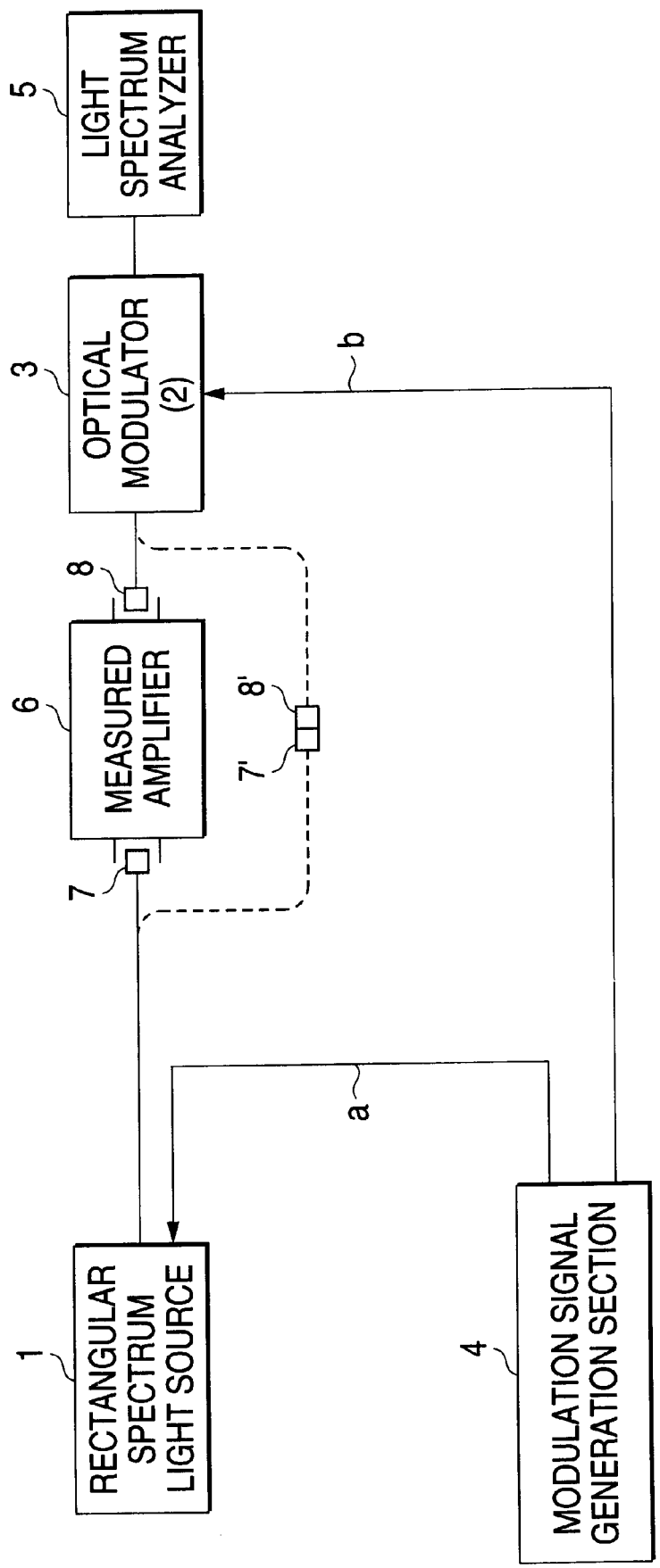
FIG. 9 is a block diagram to show the configuration of an optical amplifier evaluation instrument and an optical amplifier evaluation method in a third embodiment of the invention.

In FIG. 1, first the rectangular shape spectrum light source 1 outputs a continuous spectrum whose level is flat and a wide band in the wavelength range required by the measuring person. FIG. 2 is a drawing to show an ideal spectrum shape output by the rectangular spectrum light source in the first embodiment of the invention. That is, an output spectrum 9 as shown in FIG. 9 is output from the rectangular spectrum light source 1; the rectangular spectrum is not limited to such an ideal spectrum shape. Generally, amplified spontaneous emission output by the optical amplifier such as EDFA, to be evaluated in the invention when no signal light is input is spectrum-shaped through a filter, etc., for use, but the invention is not limited to it and a semiconductor light emission element of SLD (super luminescent diode), etc., may be used.

The first optical modulator 2 is a high-speed optical switch and fast pulse-modulates continuous light output from the rectangular spectrum light source 1. The first optical modulator 2 is controlled by a pulse signal [a] output by the modulation signal generation section 4 and the modulation frequency is determined by the atomic lifetime at an upper level of an amplification medium of the measured optical amplifier or the carrier lifetime. At present, a rare earth element doped fiber amplifier such as EDFA (erbium doped fiber amplifier) generally a fiber optical amplifier comprising a rare earth element of EDFA, etc., added with a rare earth element of erbium, etc., added into an optical fiber core is used; the atomic lifetime of rare earth element $2\tau_{eff}$ is 0.2 to several 10 msec and thus the modulation frequency may be about 10 kHz. However, most optical amplifiers developed in recent years vary excitation light power based on feedback and perform constant control of a gain or output light power and the time constant of feedback cannot be ignored and thus the modulation frequency is set to 125 kHz or more in the embodiment.

In recent years, study of a semiconductor optical amplifier using a semiconductor element as an amplification medium has been conducted, and the semiconductor optical amplifier has atom carrier lifetime $2\tau_{eff}$ of several ns or less. Therefore, if the measured optical amplifier 6 is a semiconductor optical amplifier, pulse modulation is executed at a frequency of 10 GHz or more.

If the above-mentioned fast optical pulse modulation light is made incident on the measured optical amplifier 6, when the input optical pulse is on, the measured optical amplifier 6 amplifies signal light made incident by stimulated emission. When the optical pulse is off, the measured optical amplifier 6 does not amplify signal light made incident by stimulated emission, and wide-band amplified spontaneous emission is output by spontaneous emission.

An electron excited from a base level to an upper level by excitation energy to a rare earth element emits a photon by a spontaneous emission process of spontaneously emitting energy at a certain probability, and the photon is amplified and output by a stimulated emission process as the amplification medium is advanced.

At this time, if it is assumed that the excitation energy is constant, when no input, namely, no signal light is input to the amplification medium, most of the excitation energy is used for emission of a photon by spontaneous emission and amplification in the stimulated emission process of the emitted photon by spontaneous emission. However, if signal light is input, most of the excitation energy is used for amplifying the signal light input by stimulated emission depending on the light energy of the input signal light and thus the photon emission amount by spontaneous emission is decreased according to the law of conservation of energy.

Thus, the output power of the amplified spontaneous emission changes depending on whether or not signal light exists, but the time constant of the spontaneous emission process is determined by the atomic lifetime $2\tau_{eff}$ at the upper level of rare earth element and thus the on/off switch time of signal light should be faster than $2\tau_{eff}$. If the signal light is switched in a sufficiently shorter period than $2\tau_{eff}$, a constant power of amplified spontaneous emission is output independently of whether the signal light is on or off. The amplified spontaneous emission quantity is determined by the time average value of signal light power.

When WDM signal light, etc., provided by multiplexing signal light beams having a plurality of wavelengths (namely, frequencies) is input to the excited amplification medium, the signal light having each wavelength is amplified by stimulated emission and the amplification factor varies from one wavelength to another. If the signal light beams multiplexed equal in total band width and center wavelength and total light power, the gains and noise figures of the wavelengths become equal regardless of the number of channels (namely, the number of multiplex wavelengths). However, this condition is satisfied when the channel (wavelength) interval becomes narrower than one value, and if the channel interval is wide, the condition does not apply. The phenomenon is caused by the homogeneous characteristic of the amplification medium of a rare earth element, etc., and the channel (wavelength) interval is narrow if the amplification wavelength is short; the channel (wavelength) interval becomes wider as the amplification wavelength becomes longer.

Therefore, if the use condition of the measured optical amplifier 6, namely, the input wavelength interval satisfies the above-mentioned condition, even if the WDM signal light provided by multiplexing a large number of signal light beams is not used, the same result as that using WDM light source can be provided if wide-band spectrum light of the rectangular shape spectrum light source having a continuous spectrum described above or the like is made incident and the gain and noise figure are measured. That is, the invention focuses attention on such a phenomenon.

Figure 3:
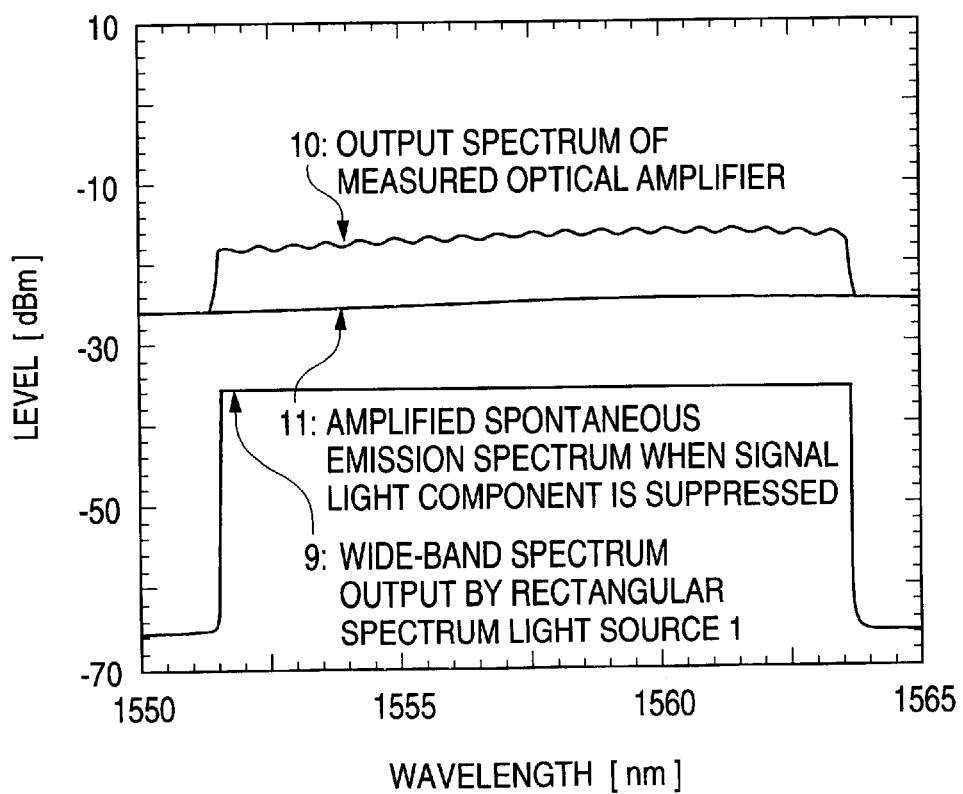
FIG. 3 is a drawing to show the amplification form of a measured optical amplifier based on an input rectangular spectrum and output light spectrum of the measured optical amplifier in the first embodiment of the invention.

This point will be discussed in detail with reference to the accompanying drawings. FIG. 3 is a drawing to show the amplification form of the measured optical amplifier based on an input rectangular spectrum and output light spectrum of the measured optical amplifier in the first embodiment of the invention. That is, it shows a wide-band spectrum 9 output by the rectangular spectrum light source 1, an output light spectrum 10 amplified by the measured optical amplifier 6, and a amplified spontaneous emission spectrum 11 at the amplification time, output by the measured optical amplifier 6 with the signal light component suppressed. The wavelength axis and the level axis are shown as an example and the invention is not limited to them.

Figure 4:
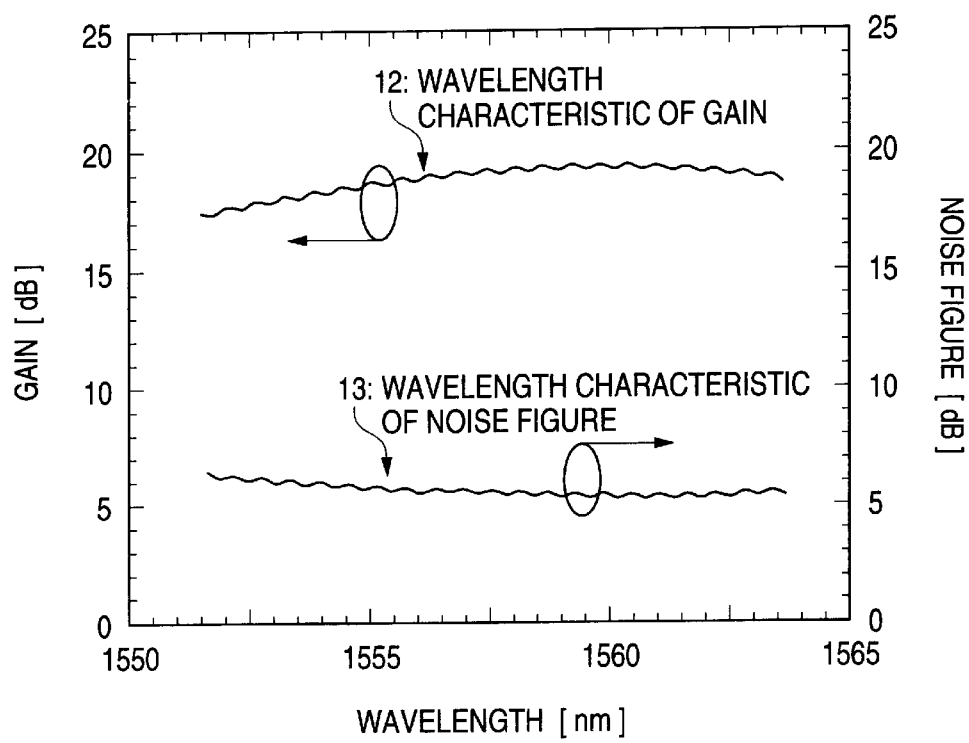
FIG. 4 is a drawing to show the gain characteristic and noise figure characteristic of the measured optical amplifier, measured in the first embodiment of the invention with a wavelength axis as a variable

FIG. 4 is a drawing to show the gain characteristic and noise figure characteristic of the measured optical amplifier 6, measured in the first embodiment of the invention with a wavelength axis as a variable. That is, it shows wavelength characteristic of the gain, 12, and wavelength characteristic of the noise figure, 13. The result provided in the related art is limited to the provided wavelengths as described above, but the measurement result can be found as continuous data according to the first embodiment of the invention.

Figure 5:
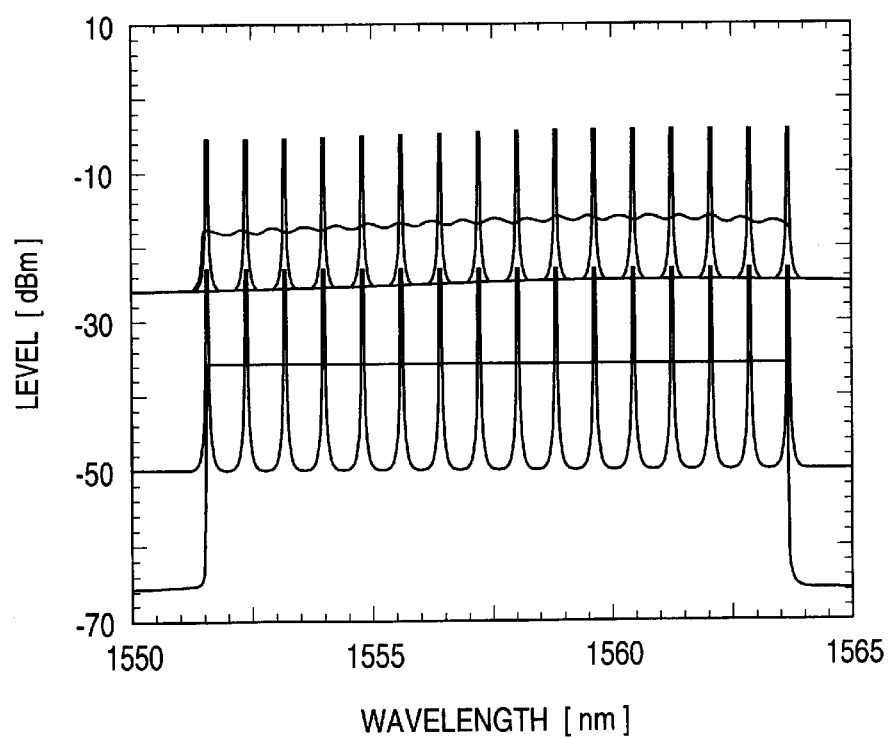
FIG. 5 is a drawing to show the amplification form when wavelength multiplexed signal light in the first embodiment of the invention and wavelength multiplexed signal light in the related art are input to the same measured optical amplifier.

FIG. 5 shows comparison between the amplification form in the related art and that of the measured optical amplifier 6 in the first embodiment of the invention. That is, it is a drawing to show the amplification form when wavelength multiplexed signal light in the first embodiment of the invention and wavelength multiplexed signal light in the related art are input to the same measured optical amplifier.

Figure 6:
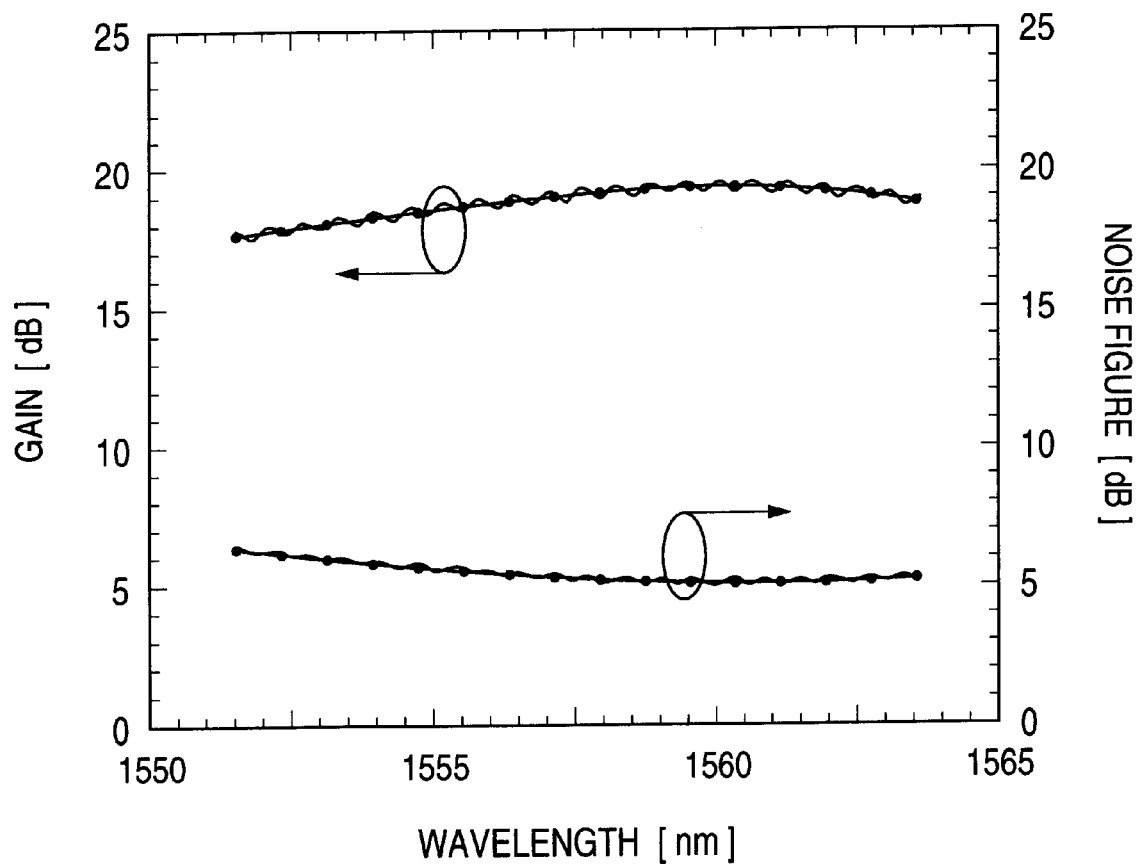
FIG. 6 is a drawing to show comparison between the gain characteristic and the noise figure characteristic in the first embodiment of the invention and those in the related art with a wavelength axis as a parameter.

FIG. 6 shows comparison between the gain characteristic and the noise figure characteristic in the first embodiment of the invention and those in the related art. That is, it is a drawing to show comparison between the gain and noise figure measurement results of the measured optical amplifier in the optical amplifier evaluation method in the first embodiment of the invention and those in the optical amplifier evaluation method in the related art with a wavelength axis as a parameter. As a result of the actual experiment, they matched about ±0.2 dB.

Based on such a principle, the post-amplified signal light and amplified spontaneous emission output from the measured optical amplifier 6 are made incident on the second optical modulator or high-speed optical switch (second optical modulator) 3 through the output optical terminal 8.

Like the first optical modulator 2, the second optical modulator 3 is controlled by the modulation signal generation section 4 and the modulation frequency of the second optical modulator 3 is the same as that of the first optical modulator 2 and can be set as desired in the 360-degree range based on the phase of the first optical modulator 2. The measured optical amplifier 6 outputs signal light power $[P_{out\_n}]$ of the amplified signal light undergoing pulse modulation and amplified spontaneous emission power $[P_{ASE\_n}]$ of the measured optical amplifier 6 output in a time domain wherein the optical pulse signal does not exist in time sequence as output light.

Figure 7:
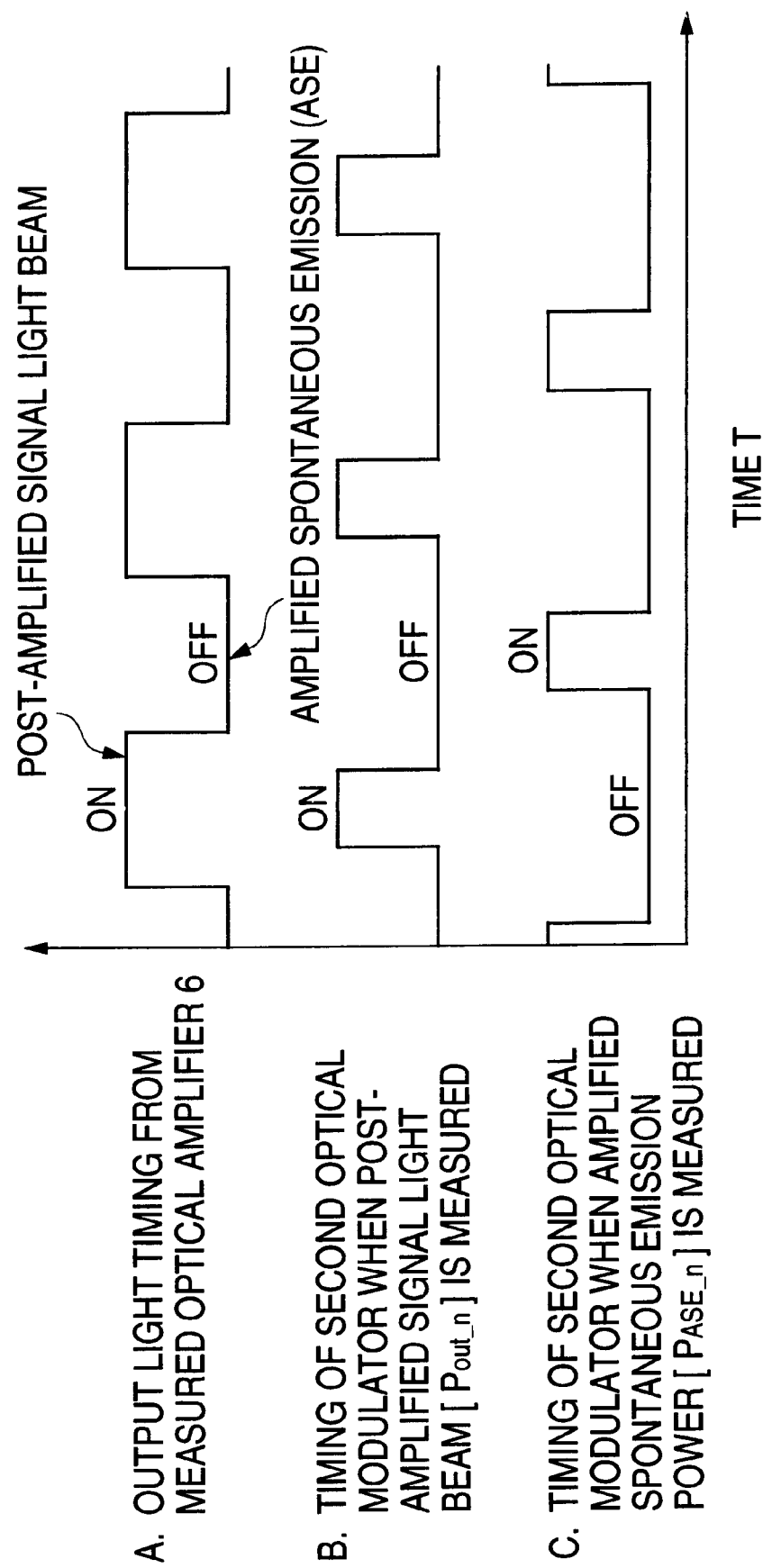
FIG. 7 is a drawing to show the relative phase relationship between pulse light output by the measured optical amplifier and a second optical amplifier in the first embodiment of the invention.

FIG. 7 is a drawing to show relative phase relationships between pulse light output by the measured optical amplifier and the second optical amplifier in the first embodiment of the invention. As shown in the figure, the measured optical amplifier 6 outputs timing pulses as shown in OUTPUT LIGHT TIMING (A). The second optical modulator 3 is tuned with the timings at which two different light outputs exist, whereby the amplified signal light power and the amplified spontaneous emission power can be detected. That is, to detect the amplified signal light power $[P_{out\_n}]$, the phase of the second optical modulator 3 is set as shown in B (timing of second optical modulator when post-amplified signal light beam $[P_{out\_n}]$ is measured) in FIG. 7.

At this time, the amplified spontaneous emission is suppressed because of the off state of the second optical modulator 3. To detect the amplified spontaneous emission, the phase of the second optical modulator 3 is set as shown in C (timing of second optical modulator when amplified spontaneous emission power $[P_{ASE\_n}]$ is measured) in FIG. 7. At this time, the amplified signal light is suppressed because of the off state of the second optical modulator 3.

As described above, the post-amplified signal light power $[P_{out\_n}]$ and the amplified spontaneous emission power $[P_{ASE\_n}]$ are measured in the wavelength (frequency) components ($v_1$ to $v_m$) of the rectangular shape spectrum light source 1 and the gain $[G_n]$ is found according to expression (7) and the noise figure $[NF_n]$ is found according to expression (8):

$$G_n = \frac{P_{out\_n} - P_{ASE\_n}}{P_{in\_n}} \quad (7)$$

$$NF_n = \frac{P_{ASE\_n}}{h \cdot v_n G_n \cdot v_n} + \frac{1}{G_n} \quad (8)$$

where n is 1 to m.

That is, calculation is thus performed, whereby the gain characteristic $[G_n]$ and the noise figure characteristic $[NF_n]$ can be found easily and precisely at each wavelength (frequency) of the measured optical amplifier 6.

Next, a second embodiment of the invention will be discussed. To improve the characteristic at the WDM signal amplification time, most optical amplifiers developed in recent years comprise each a gain corrector called a gain equalizer for improving the wavelength characteristic of an amplification factor. The gain equalizer is formed of passive device of a dielectric multi-layer filter, an optical fiber Bragg grating, etc. The device itself contains a fine ripple, etc., and consequently the ripple appears in the gain characteristic and the noise figure characteristic of the optical amplifier.

If one optical amplifier has a small ripple width, in fact the optical amplifiers are used as multi-stage relay in most cases and thus if the characteristic is the same, the ripple width is increased depending on the number of relay stages and finally may become a ripple width that cannot be ignored. Because of the ripple, a slope occurs in the gain and the noise figure and the light source wavelength is shifted, thus the gain and the noise figure change largely.

In the related art, the gain and the noise figure are measured only at the wavelengths of the provided light sources and thus it is difficult to clarify the gain and noise figure slopes caused by such a fine ripple.

Figure 8:
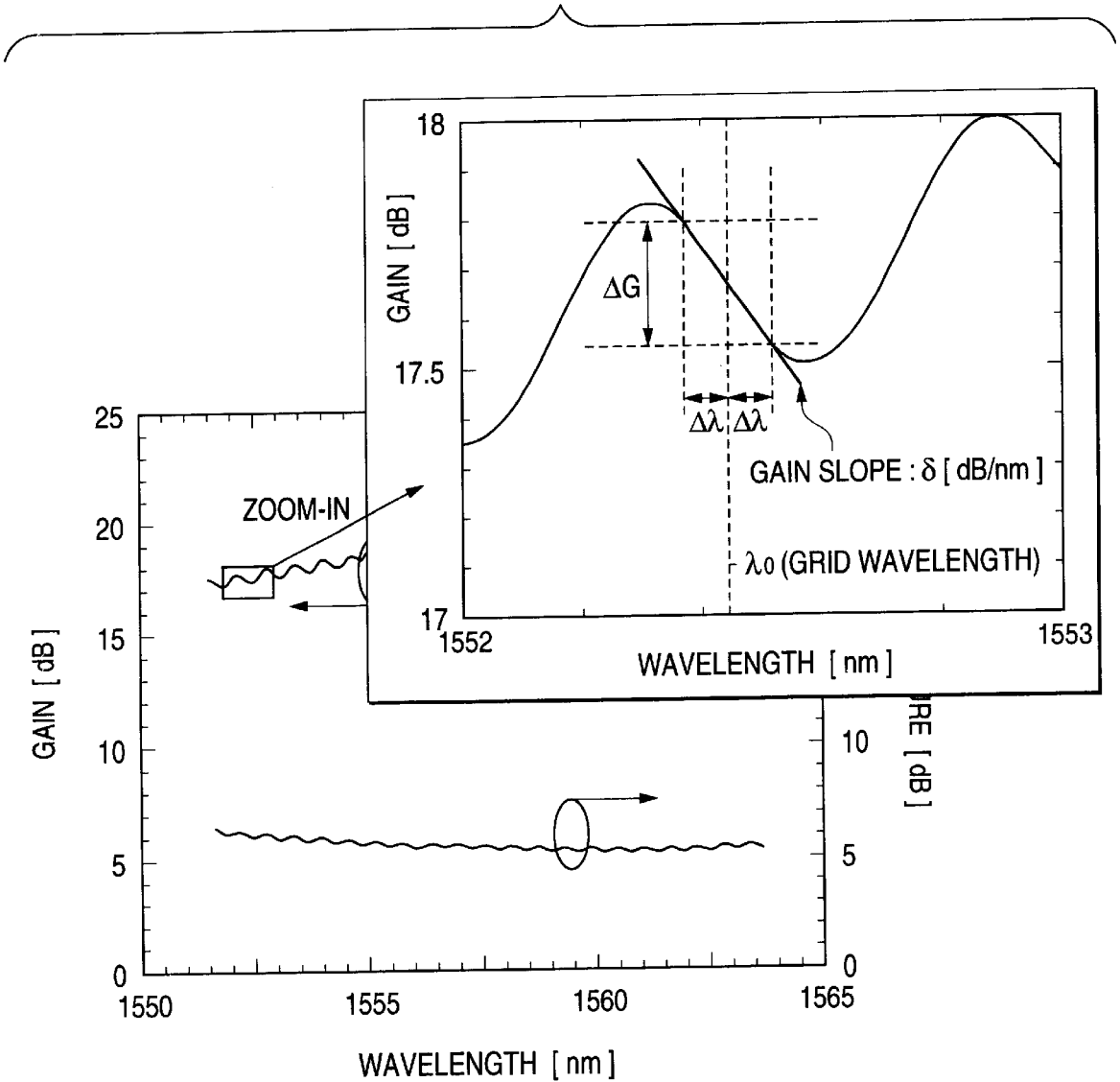
FIG. 8 is a drawing to show an example of a gain slope caused by a ripple contained in a measured optical amplifier in a second embodiment of the invention.

The second embodiment pays attention to the importance of the above-described problem and can be realized easily by using a rectangular spectrum light source as described in the first embodiment. That is, the gain and noise figure characteristics of the measured optical amplifier 6 provided in the first embodiment are those shown in FIG. 4 and FIG. 8 shows a part of FIG. 4 on an enlarged scale. That is, FIG. 8 is a drawing to show an example of a gain slope caused by a ripple contained in the measured optical amplifier in the second embodiment of the invention.

In FIG. 8, $\Delta\lambda$ is a wavelength shift amount from an originally setup light source wavelength $\lambda 0$ and $\Delta G$ is the gain change width when $2\Delta\lambda$ shift occurs. The parameters can be used to easily find a gain slope $\delta$.

FIG. 8 shows only one example of the gain slope and the gain slope is not limited to it. In the example, the gain slope is described; the description can also be applied to the noise figure and a noise figure slope can also be easily found according to the embodiment.

Next, a third embodiment of the invention will be discussed. FIG. 9 is a block diagram to show the configuration of an optical amplifier evaluation instrument and an optical amplifier evaluation method in the third embodiment of the invention. The configuration in FIG. 9 is the same as that previously described with reference to FIG. 1 except that the first optical modulator 2 in the first embodiment is removed. That is, in the first embodiment, the rectangular spectrum light source 1 emits continuous light; if the rectangular spectrum light source 1 is provided with a direct modulation function with an electric signal, an easy and highly accurate optical amplifier evaluation method can be realized according to the configuration as shown in FIG. 9 without using the first optical modulator 2.

Next, a fourth embodiment of the invention will be discussed. In the first embodiment of the invention, when the post-amplified signal light power [$P_{out\_n}$] and the amplified spontaneous emission power [$P_{ASE\_n}$] are measured, the phase of the second optical modulator 3 relative to the first optical modulator 2 is shifted 180 degrees for output. However, if their synchronization is not complete or if the phases overlap each other, the components of the post-amplified signal light power [$P_{out\_n}$] and the amplified spontaneous emission power [$P_{ASE\_n}$] are leaked into output from the second optical modulator 3 and it is made impossible to execute precise measurement.

Then, in the fourth embodiment, the on/off ratio between a first optical modulator 2 and a second optical modulator 3 is changed and the on duration of the second optical modulator 3 is set shorter than that of the first optical modulator 2 for solving the above-described problem.

Figure 10:
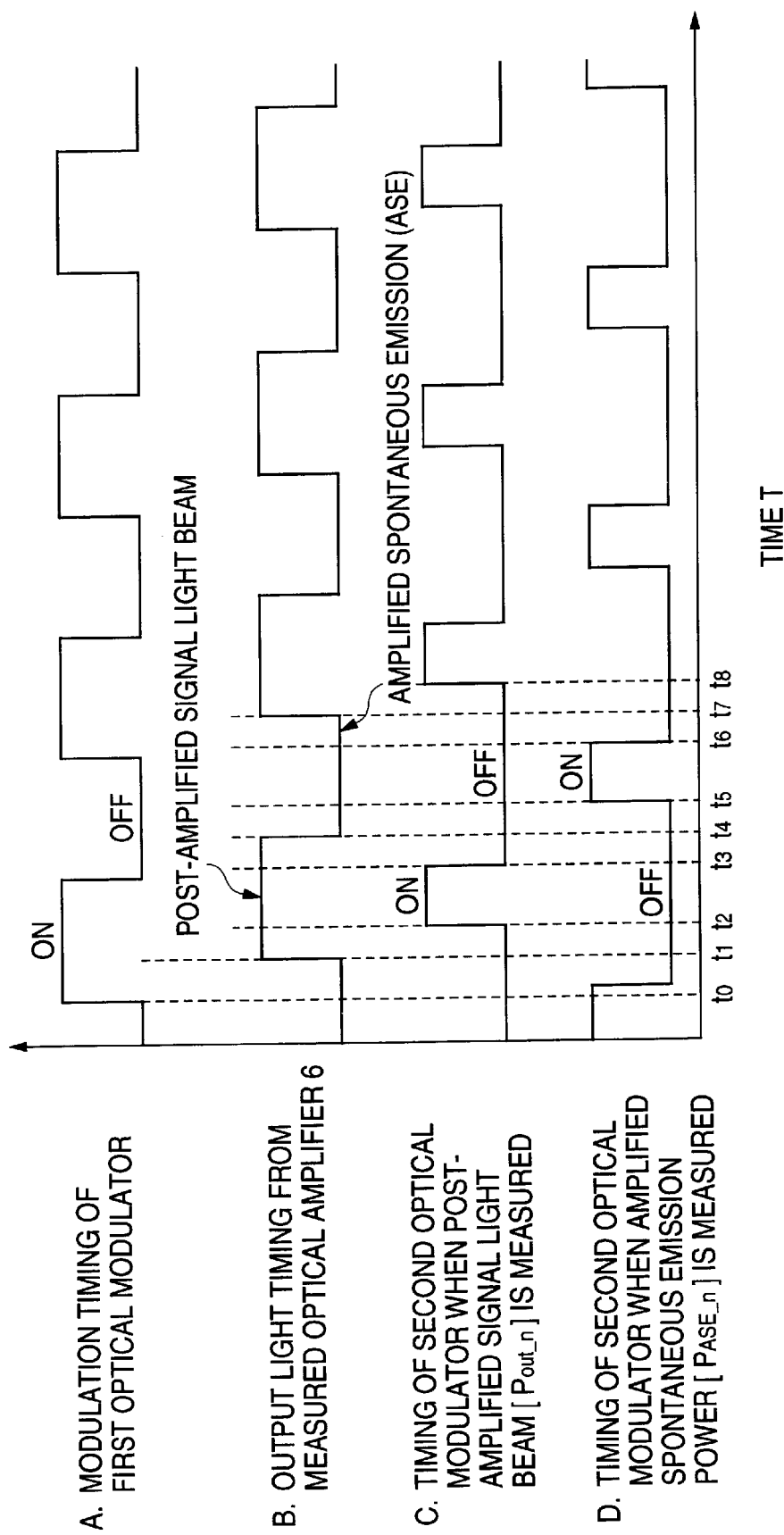
FIG. 10 is a drawing to show the relative phase relationships among a first modulator, pulse light output by a measured optical amplifier, and a second optical amplifier in a fourth embodiment of the invention.

That is, FIG. 10 is a drawing to show the relative phase relationships among the first modulator, pulse light output by a measured optical amplifier, and the second optical amplifier in the fourth embodiment of the invention. In FIG. 10, A is the modulation signal timing of the first optical modulator 2 output from a modulation signal generation section 4, B is the output light timing at which signal light output from the first optical modulator 2 is output after it is amplified by a measured optical amplifier 6, C is the modulation signal timing of the second optical modulator 3 when post-amplified signal light power [$P_{out\_n}$] is detected, and D is the modulation signal timing of the second optical modulator 3 when amplified spontaneous emission power [$P_{ASE\_n}$] is detected.

The time difference occurring between the timings A and B is a delay received when the signal light propagates through the measured optical amplifier 6. The delay time varied depending on the configuration of the measured optical amplifier 6 and therefore it is desirable that the modulation signal generation section 4 should have a function of correcting the delay amount.

The timing at which the post-amplified signal light power [$P_{out\_n}$] is detected is a combination of the timings B and C; the optical modulators operate at the following timings by changing the on/off ratio described above:

Time t0–t1 is a delay when the pulse modulation signal light propagates through the measured optical amplifier 6. The post-amplified pulse signal light output from the measured optical amplifier 6 is turned on at t1 and is turned off at t4. To detect the post-amplified signal light power [$P_{out\_n}$] in the embodiment, the second optical modulator 3 is turned on at the timing t2 and is turned off at the timing t3. The timings are set to such relative timings, whereby guard times of the time t1–t2 and the time t3–t4 are provided and if relative position fluctuation of modulation signal or the like occurs to some degree, the post-amplified signal light power [$P_{out\_n}$] can be detected precisely.

Likewise, to detect the amplified spontaneous emission power [$P_{ASE\_n}$], pulse light is off to the time t4–t7 and it is made possible to detect amplified spontaneous emission. The timings B and D are combined. At the time, the phase of the second optical modulator 3 is shifted 180 degrees from the timing C and the second optical modulator 3 is turned on at the timing t5 and is turned off at the timing t6, whereby guard times of the time t4–t5 and the time t6–t7 are provided. Accordingly, the amplified spontaneous emission power [$P_{ASE\_n}$] can also be detected precisely, so that the gain and noise figure characteristics of the optical amplifier can be evaluated easily and with high accuracy regardless of the observer.

Figure 11:
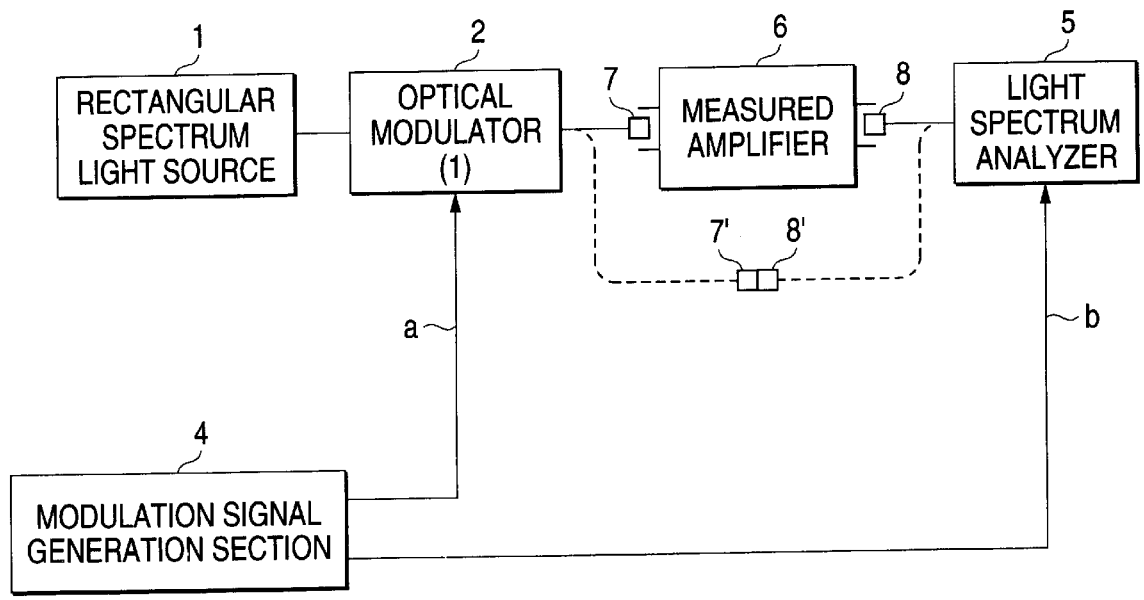
FIG. 11 is a block diagram to show the configuration of an optical amplifier evaluation instrument and an optical amplifier evaluation method in a fifth embodiment of the invention.

Next, a fifth embodiment of the invention will be discussed. FIG. 11 is a block diagram to show the configuration of an optical amplifier evaluation instrument and an optical amplifier evaluation method in the fifth embodiment of the invention. The configuration in FIG. 11 is the same as that previously described with reference to FIG. 1 except that the second optical modulator 3 in the first embodiment is removed.

Figure 12:
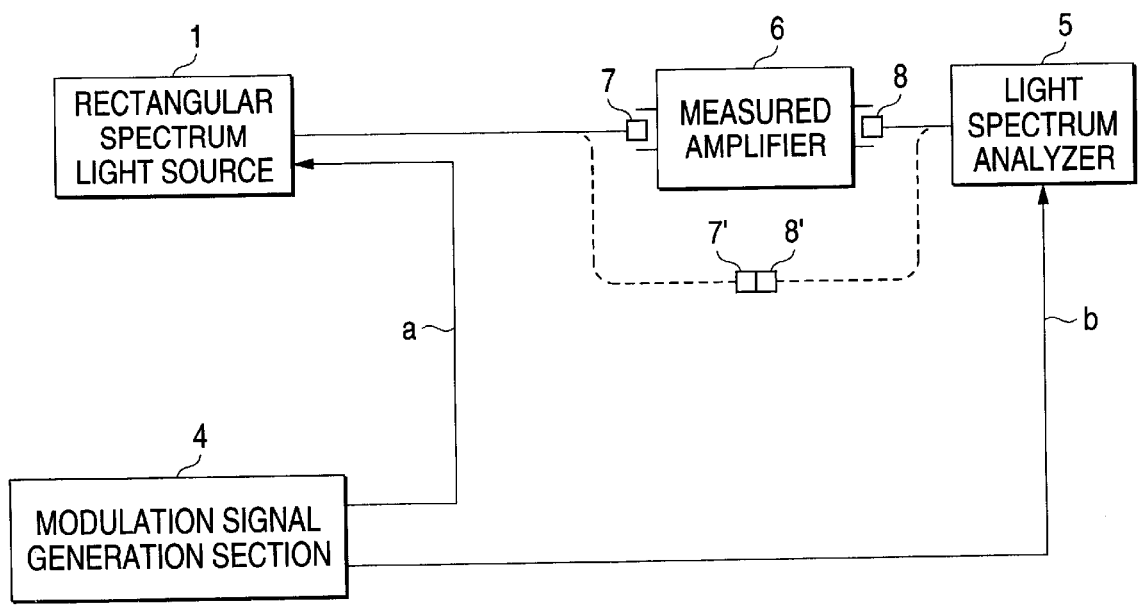
FIG. 12 is a block diagram to show another configuration of the optical amplifier evaluation instrument and the optical amplifier evaluation method in the fifth embodiment of the invention.

In the optical amplifier evaluation method in the invention, if the light intensity measuring instrument 5 such as a light spectrum analyzer comprises a gate measuring function of measuring in synchronization with an external timing signal [b], the second optical modulator 3 can be omitted as in the configuration shown in FIG. 11. FIG. 12 is a block diagram to show another configuration of the optical amplifier evaluation instrument and the optical amplifier evaluation method in the fifth embodiment of the invention. That is, as shown in FIG. 12, the rectangular pulse light source in the third embodiment may be used together. Thus, the simplified optical amplifier evaluation method can be realized according to the fifth embodiment.

Next, a sixth embodiment of the invention will be discussed. The sixth embodiment is characterized by the fact that an acousto-optic modulator (AOM) or an acousto-optic switch (AOS) is used with a first modulator 2 and a second optical modulator 3.

That is, the acousto-optic modulator or the acousto-optic switch operates at high speed as compared with various modulators or switches and is high in on/off extinction ratio and thus is optimum for the invention. The easily available acousto-optic modulator or acousto-optic switch at present can modulate to several MHz and thus can modulate in a sufficiently shorter period than the atomic lifetime $2\tau_{\it eff}$ at the upper level of rare earth element. The extinction ratio in a single unit is about 40 to 60 dB. If the gain of a measured optical amplifier 6 is large and amplified signal light cannot completely be extinguished, multiple stages of the acousto-optic modulators or acousto-optic switches are cascaded, whereby a very high extinction ratio can be provided easily.

Next, a seventh embodiment of the invention will be discussed. In the embodiment, based on the above-described optical amplifier evaluation method, a control and arithmetic unit of a CPU, etc., is provided for controlling components such as a modulation signal generation section 4 and a light intensity measuring instrument 5 and reading and computing the measurement result of the light intensity measuring instrument 5, whereby an optical amplifier evaluation instrument that can measure the gain and noise figure characteristics of a measured optical amplifier 6 easily and with high accuracy independently of the measuring person can be provided.

Next, an eighth embodiment of the invention will be discussed. The described optical amplifier evaluation instrument of the seventh embodiment further comprises an optical variable attenuator, etc., in which an arbitrary attenuation amount can be set between a rectangular spectrum light source 1 and a measured optical amplifier 6 and the optical variable attenuator, etc., is controlled by a control and arithmetic unit, whereby it is made possible to automatically set input signal light power $[P_{in\_n}]$ to the measured optical amplifier 6 to any value desired by the measuring person.

Therefore, a plurality of different types of input signal light power $[P_{in\_n}]$ can be set automatically and the optical amplifier evaluation instrument that can measure the gain and noise figure characteristics of a measured optical amplifier 6 easily and with high accuracy can be provided.

Next, a ninth embodiment of the invention will be discussed. To compute the gain and noise figure of a measured optical amplifier 6 in an optical amplifier evaluation instrument, it is necessary to measure signal light power input to the measured optical amplifier 6, $[P_{in\_n}]$, signal light power amplified by the measured optical amplifier 6, $[P_{out\_n}]$, and amplified spontaneous emission power output by the measured optical amplifier 6, $[P_{ASE\_n}]$. The amplified signal light power $[P_{out\_n}]$ and the amplified spontaneous emission power $[P_{ASE\_n}]$ can be found by shifting the phase of the second optical modulator 3 as described in the preceding embodiments, but the input signal light power $[P_{in\_n}]$ needs to be previously found before the measured optical amplifier 6 is connected.

To set the signal light power input to the measured optical amplifier 6, $[P_{in\_n}]$, in a plurality of different conditions with an optical variable attenuator, etc., as described above in the eighth embodiment, it is necessary to measure all before the measured optical amplifier 6 is connected, and an error may occur in the measurement result because of connection change by the measuring person, accidental light source output power fluctuation, or the like; it is difficult to provide an automatic and highly accurate optical amplifier evaluation instrument.

Figure 13:
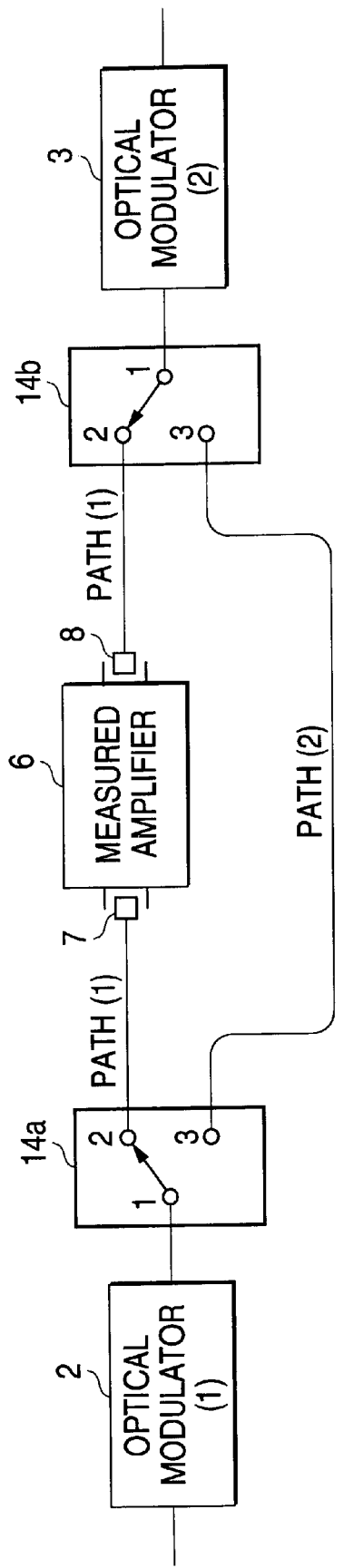
FIG. 13 is a block diagram to show a configuration example of optical path switch means in a ninth embodiment of the invention.

Then, in the ninth embodiment, a circuit configuration as shown in FIG. 13 is provided to solve the above-described problem. That is, FIG. 13 is a block diagram to show a configuration example of optical path switch means in the ninth embodiment of the invention. In the ninth embodiment, to solve the above-described problem, optical path switch means 14a and 14b of 1×2 optical switches, etc., are provided as shown in FIG. 13. That is, an input optical terminal 7 is connected to a terminal 2 of the optical path switch means 14a and an output optical terminal 8 is connected to a terminal 2 of the optical path switch means 14b, whereby the optical path switch means 14a and 14b are connected to a measured optical amplifier 6 as a path (1). A terminal 3 of the optical path switch means 14a and a terminal 3 of the optical path switch means 14b are directly connected as a path (2). Accordingly, the paths (1) and (2) are switched for each measurement item, whereby the above-described problem is solved and an optical amplifier evaluation instrument that can automatically measure the gain and noise figure characteristics of the measured optical amplifier easily and with high accuracy independently of the measuring person can be provided.

Figure 14:
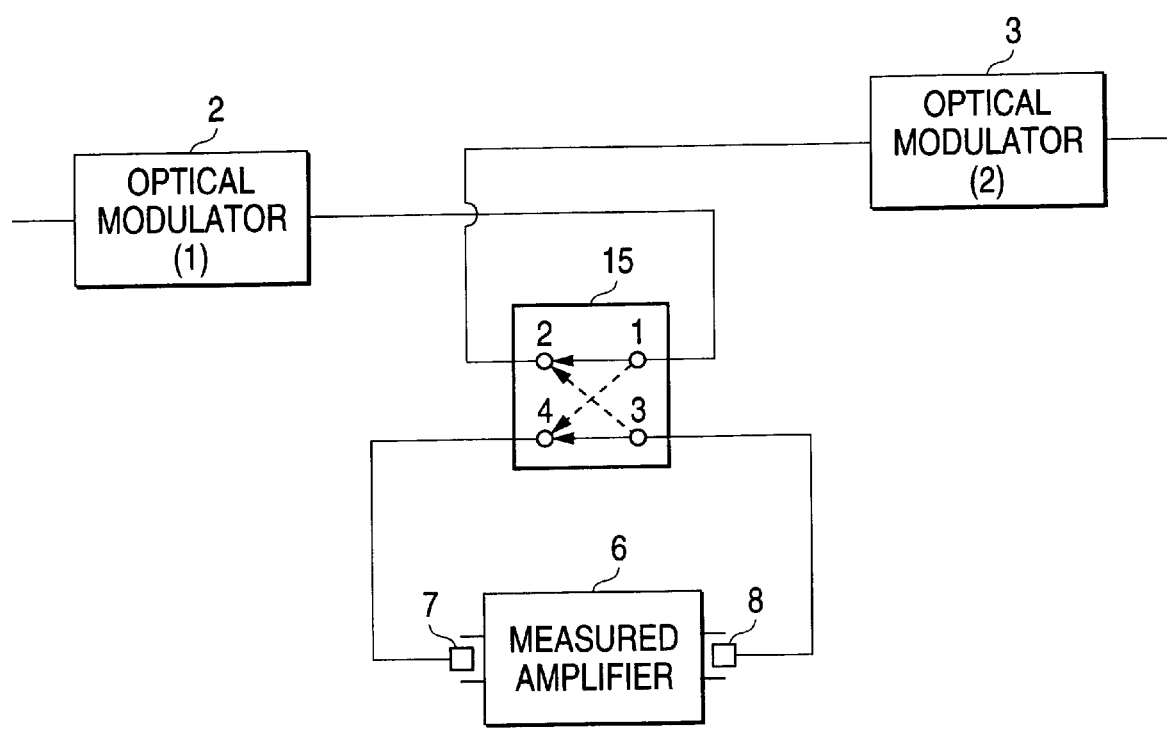
FIG. 14 is a block diagram to show another configuration example of optical path switch means in the ninth embodiment of the invention.
Figure 15:
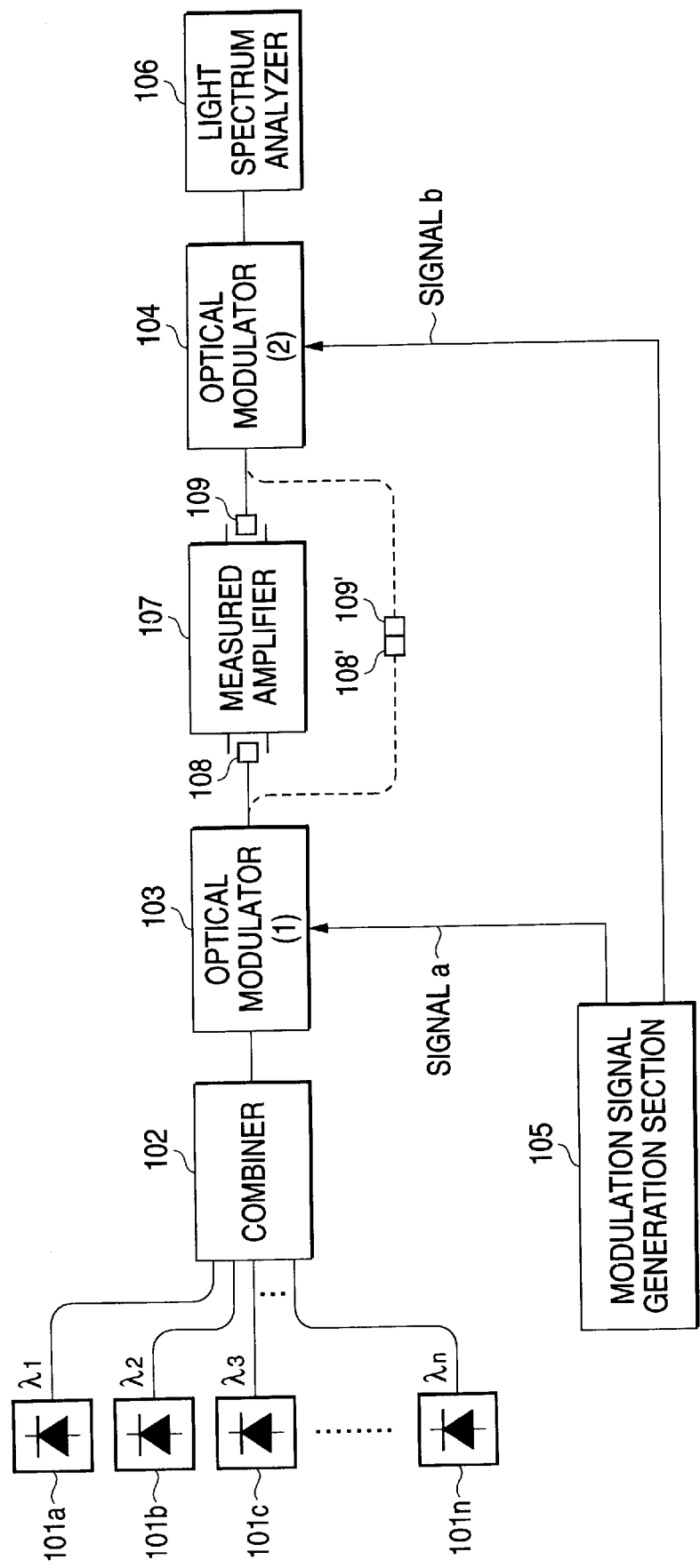
FIG. 15 is a block diagram to show the configuration of an optical amplifier evaluation instrument and an optical amplifier evaluation method in a related art.
Figure 16:
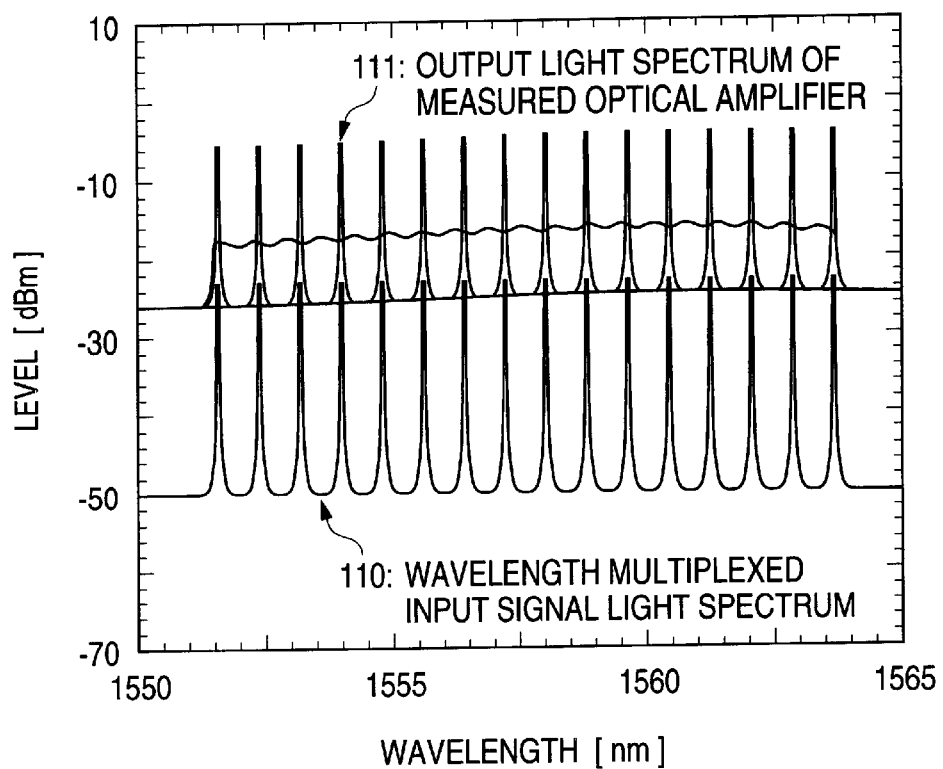
FIG. 16 is a drawing to show the wavelength multiplexed signal light beam amplification form of a measured optical amplifier in the related art.
Figure 17:
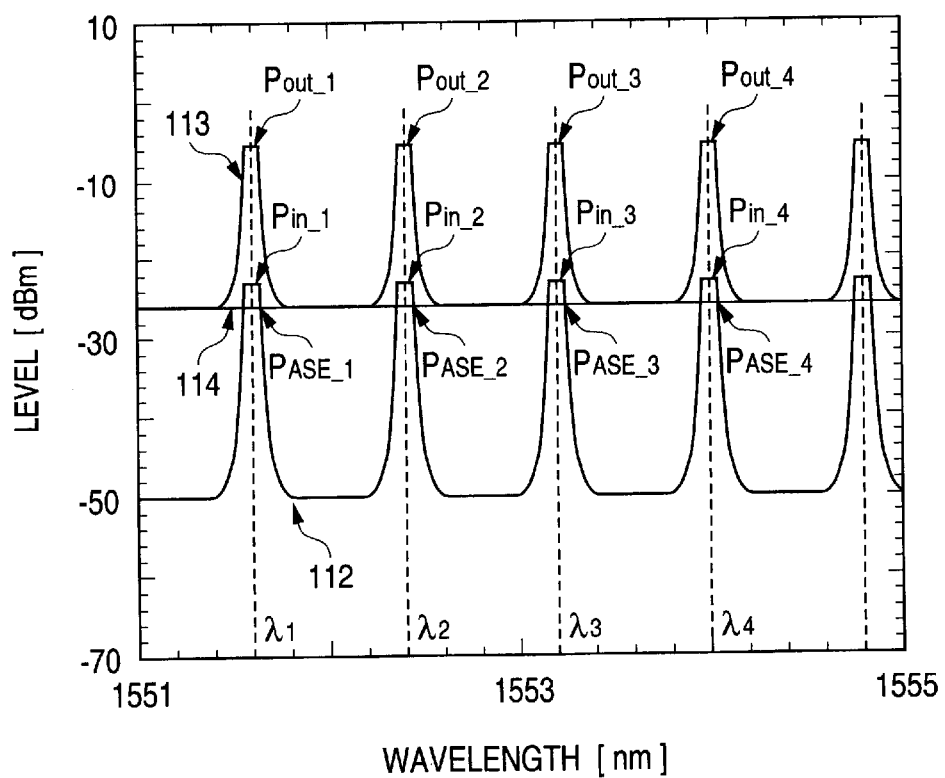
FIG. 17 is a drawing to show each optical power measured in the related art as spectrum display.
Figure 18:
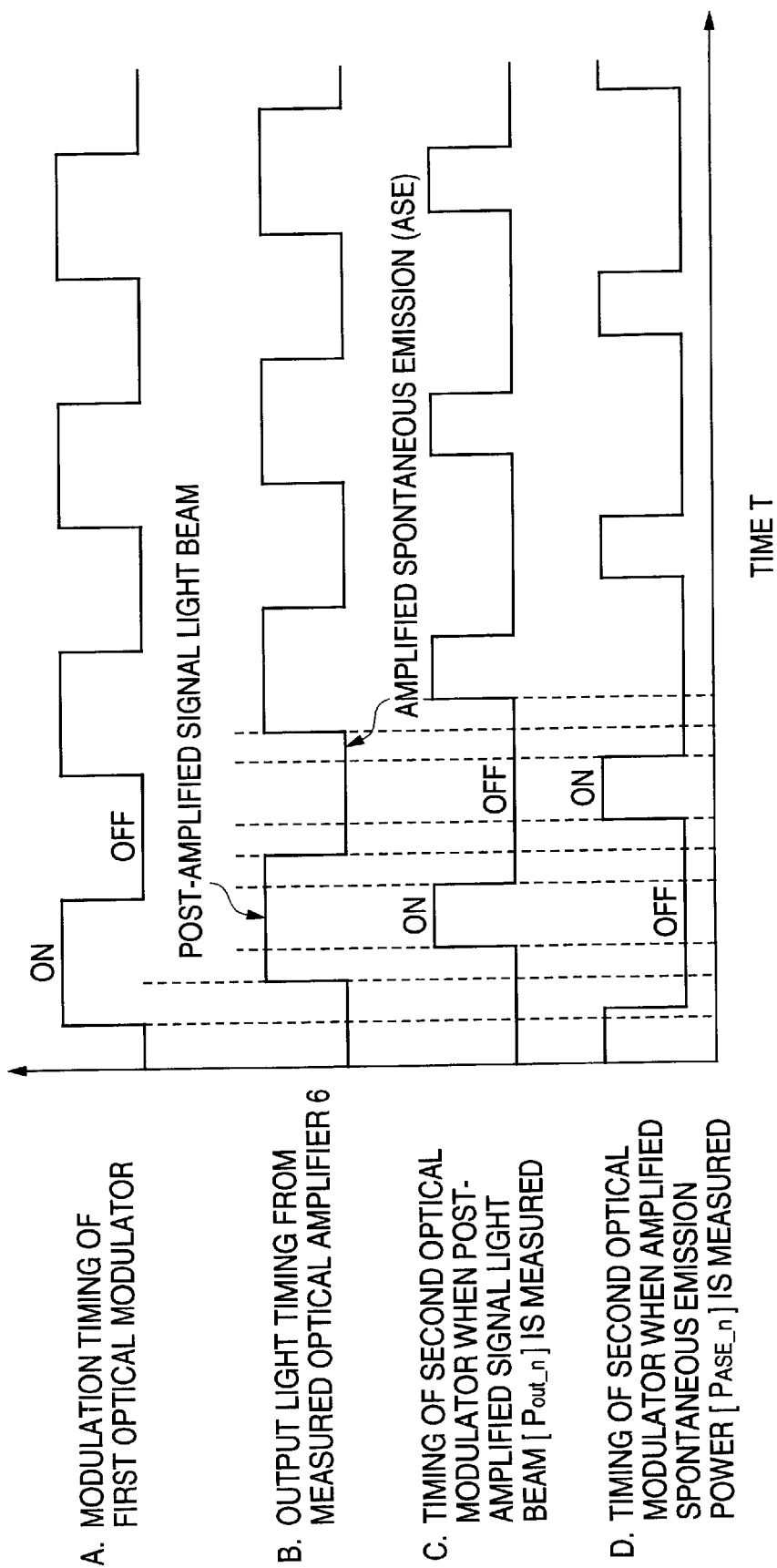
FIG. 18 is a drawing to show the relative phase relationships among a first modulator, pulse light output by the measured optical amplifier, and a second modulator in the related art.
Figure 19:
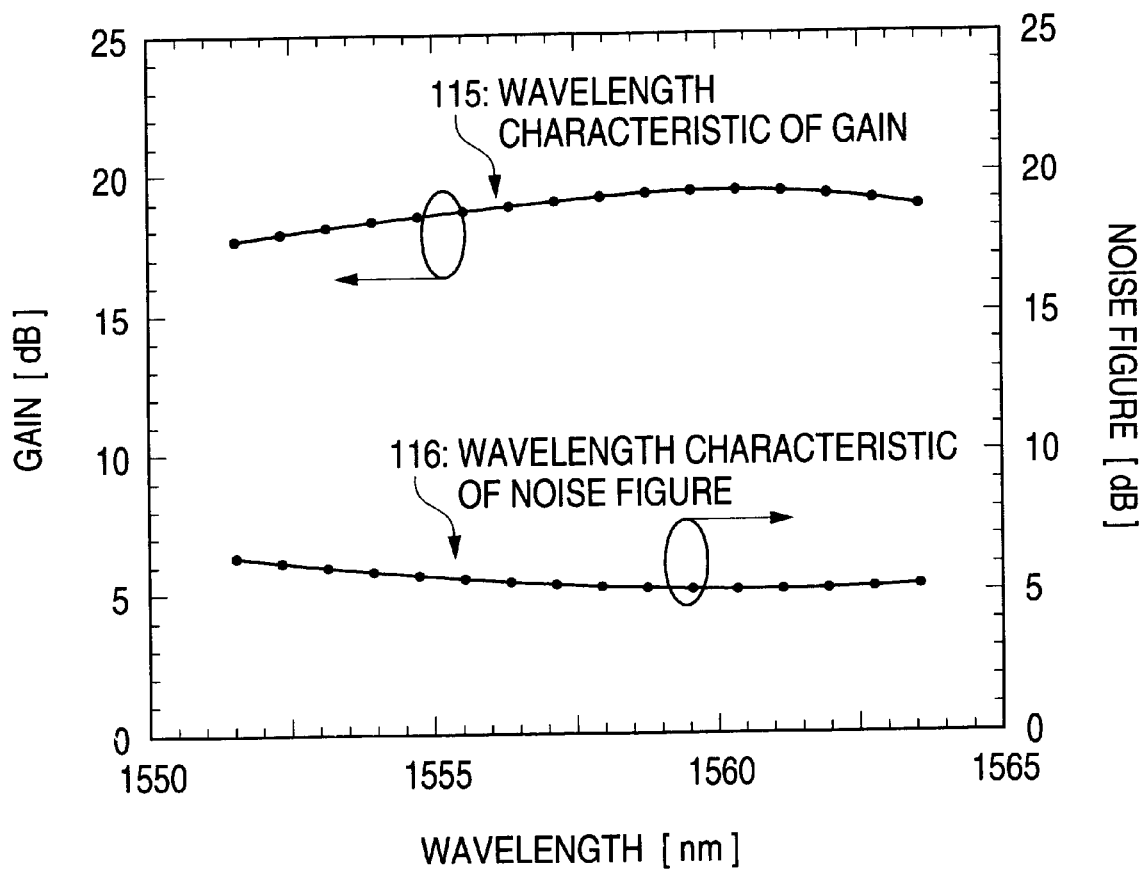
FIG. 19 is a drawing to show the measurement results of the gain and noise figure of the measured optical amplifier in the optical amplifier evaluation method and the optical amplifier evaluation instrument in the related art with a wavelength axis as a variable.

FIG. 14 is a block diagram to show another configuration example of optical path switch means in the ninth embodiment of the invention. That is, optical path switch means 15 is a 2×2 optical switch, the switch form is a cross type, and terminals 1 and 3 can be set to terminals 2 and 4 relatively. The forms of the optical path switch means described in the embodiment are only as an example and any other form may be adopted and the optical path switch means are not limited to the forms shown in the figures.

As described above, according to the invention, the optical amplifier evaluation method and the optical amplifier evaluation instrument that can measure the gain and noise figure characteristics of an optical amplifier easily and with high accuracy without causing a measurement result difference to occur depending on the measuring person and continuously measure a large number of optical amplifiers can be provided.

According to the invention, the gain and noise figure characteristics at wavelength multiplexed signal light amplification time can be measured continuously easily and with high accuracy without providing a large number of light sources and the performance of a plurality of measured optical amplifiers can be determined with less variations and automatically.

Further, according to the invention, research and development, manufacturing inspection and delivery inspection, aging degradation inspection, etc., of optical amplifiers can be conducted easily and precisely. Since the method and the apparatus of the invention can be used to easily and precisely measure any kind of the optical amplifiers used with an optical signal transmission line, noise design of the optical signal transmission line containing a transmission line, turnouts, etc., can be carried out properly.

What is claimed is:

1. An optical amplifier evaluation method for an optical amplifier evaluation instrument, said instrument comprising:
   a rectangular spectrum light source for providing high-level light output having a flat characteristic at an output level in an arbitrary wavelength range of an optical signal and a rectangular spectrum shape over a wide band;
   a first optical modulator for pulse-modulating output light of said rectangular spectrum light source and causing an on/off state of an optical signal to exist in a time domain in any constant period;
   a second optical modulator for performing on/off pulse operation in the same period as said first optical modulator in synchronization therewith, thereby providing a sampling window in a time domain for extracting and suppressing an optical signal;
   a modulation signal generation section for controlling said first optical modulator and said second optical modulator;
   a light intensity measuring instrument having an optical signal passage band width ($\Delta v_n$) for measuring the optical intensity for each frequency; and
   a measured optical amplifier formed of an optical fiber comprising a rare earth element,
   said method comprising the steps of:
      executing pulse strength modulation for an optical signal output from said rectangular spectrum light source in a sufficiently shorter period than the atomic lifetime at an upper level determined by an amplification medium of said measured optical amplifier or the carrier lifetime and feeding a pulse generated accordingly into said measured optical amplifier;
      controlling the phase of said second optical modulator, synchronizing the sampling window with a time domain in which an optical pulse signal exists, and measuring post-amplified signal light power ($P_{out\_n}$) of output light of said measured optical amplifier for each frequency component contained in said rectangular spectrum light source;
      synchronizing the sampling window with a time domain in which an optical pulse signal does not exist and measuring amplified spontaneous emission power ($P_{ASE\_n}$) of output light of said measured optical amplifier for each frequency component contained in said rectangular spectrum light source; and
      computing a noise figure of said measured optical amplifier, ($NF_n$), with respect to each of the wavelengths according to $$NF_n = \frac{P_{ASE\_n}}{hv_n G_n \Delta v_n} + \frac{1}{G_n} \quad (1)$$

wherein a Planck's constant is (h), each frequency component contained in said rectangular spectrum light source undergoing the pulse modulation is ($v_n$), the gain of said measured optical amplifier at each frequency is ($G_n$), the optical signal light passage band width of said light intensity measuring instrument when the amplified spontaneous emission power ($P_{ASE\_n}$) is measured is ($\Delta v_n$), and the sampling wavelength in a level flat portion of rectangular spectrum light source is n=1 to m.

2. The optical amplifier evaluation method as claimed in claim 1 including computing the gain of said measured optical amplifier, ($G_n$), according to $$G_n = \frac{P_{out\_n} - P_{ASE\_n}}{P_{in\_n}} \quad (2)$$

wherein light power for each wavelength component contained in said rectangular spectrum light source, ($v_n$), input to said measured optical amplifier is ($P_{in\_n}$).

3. The optical amplifier evaluation method as claimed in claim 1, wherein fluctuations of values dependent on the input optical frequencies of the gain [$G_n$] and the noise figure [$NF_n$] of said measured optical amplifier can be found continuously with respect to a wavelength axis based on continuity of the spectrum contained in said rectangular spectrum light source input to said measured optical amplifier and slopes of the gain [$G_n$] and the noise figure [$NF_n$] at any desired wavelength can be found from the result.

4. The optical amplifier evaluation method as claimed in claim 1, including driving said rectangular spectrum light source directly by an electric pulse signal to provide an input optical pulse signal.

5. The optical amplifier evaluation method as claimed in claim 1, including passing continuous output light from said rectangular spectrum light source through the first optical modulator to provide an optical pulse into input of said measured optical amplifier.

6. The optical amplifier evaluation method as claimed in claim 1, including separating the post-amplified signal light power ($P_{out\_n}$) and the amplified spontaneous emission power ($P_{ASE\_n}$) continuously output in time sequence from said measured optical amplifier.

7. The optical amplifier evaluation method as claimed in claim 1, including measuring the post-amplified signal light power ($P_{out\_n}$) and the amplified spontaneous emission power ($P_{ASE\_n}$) using a gate measuring function based on timing conducts measurement.

8. The optical amplifier evaluation method as claimed in claim 1, wherein the time as a width of the sampling window as said second optical modulator is turned on/off is shorter than the time during which said first optical modulator is on or off and relative phase relationship such that an overlap exists in time domains preceding and following the sampling window of said second optical modulator as said first optical modulator is turned on or off is set for providing guard time.

9. The optical amplifier evaluation method as claimed in claim 1, wherein the modulation frequency of intensity modulation light is at least 10 kHz.

10. The optical amplifier evaluation method as claimed in claim 1, wherein the modulation frequency of intensity modulation light is at least 1 GHz.

11. The method as claimed in any of claims 1 to 10 comprising conducting automatic measurements of the gain ($G_n$) and noise figure ($NF_n$).

12. An optical amplifier evaluation instrument comprising: a rectangular spectrum light source to provide high-level light output having a flat characteristic at an output level in an arbitrary wavelength range of an optical signal and a rectangular spectrum shape over a wide band;
   a first optical modulator to pulse-modulate output light of said rectangular spectrum light source and cause an on/off state of an optical signal to exist in a time domain in a constant period;
   a second optical modulator to perform on/off pulse operation in the same period as said first optical modulator in synchronization therewith and to provide a sampling window in a time domain for extracting and suppressing an optical signal;

a modulation signal generation section to control said first optical modulator and said second optical modulator;

a light intensity measuring instrument having an optical signal passage band width [$\Delta v_n$] to measure the optical intensity for each frequency;

a measured optical amplifier including an optical fiber comprising a rare earth element coupled between the first and second optical modulators; and a control and arithmetic unit configured to:

cause pulse strength modulation for an optical signal output from said rectangular spectrum light source in a sufficiently shorter period than the atomic lifetime at an upper level determined by an amplification medium of said measured optical amplifier or the carrier lifetime and feeding a pulse generated accordingly into said measured optical amplifier;

control the phase of said second optical modulator, synchronize the sampling window with a time domain in which an optical pulse signal exists, and cause measurement of post-amplified signal light power ($P_{out\_n}$) of output light of said measured optical amplifier for each frequency component in said rectangular spectrum light source;

synchronize the sampling window with a time domain in which an optical pulse signal does not exist and cause measurement of amplified spontaneous emission power ($P_{ASE\_n}$) of output light of said measured optical amplifier for each frequency component in the output from said rectangular spectrum light source; and compute a noise figure of said measured optical amplifier, ($NF_n$), with respect to each of the wavelengths according to $$NF_n = \frac{P_{ASE\_n}}{h v_n G_n \Delta v_n} + \frac{1}{G_n} \quad (1)$$

wherein (h) is Planck's constant, ($v_n$) is a frequency component in said rectangular spectrum light source undergoing the pulse modulation, ($G_n$) is the gain of said measured optical amplifier at a particular frequency, ($\Delta v_n$) is the optical signal light passage bandwidth of said light intensity measuring instrument when the amplified spontaneous emission power ($P_{ASE\_n}$) is measured, and the sampling wavelength in a level flat portion of said rectangular spectrum light source is n=1 to m.

13. The optical amplifier evaluation instrument as claimed in claim 12 further comprising an optical variable attenuator for varying pulse-modulated light power of said rectangular spectrum light source input to said measured optical amplifier and setting arbitrary input light power, wherein the optical variable attenuator is controlled by the control and arithmetic unit.

14. The optical amplifier evaluation instrument as claimed in claim 12, further comprising optical path switch means, wherein the optical path switch means is controlled by the control and arithmetic unit, whereby the light power for each frequency component input to said measured optical amplifier, ($P_{in\_n}$), and the post-amplified signal light power ($P_{out\_n}$) and the amplified spontaneous emission power ($P_{ASE\_n}$) output from said measured optical amplifier are measured automatically.

15. The optical amplifier evaluation instrument of claim 12 wherein control and arithmetic unit computes the gain ($G_n$) of said measured optical amplifier according to $$G_n = \frac{P_{out\_n} - P_{ASE\_n}}{P_{in\_n}} \quad (2)$$

wherein light power for each wavelength component in an output signal from said rectangular spectrum light source ($v_n$) that is input to said measured optical amplifier is ($P_{in\_n}$).

16. The optical amplifier evaluation instrument of claim 12 wherein fluctuations of values dependent on the input optical frequencies of the gain ($G_n$) and the noise figure ($NF_n$) of said measured optical amplifier can be found continuously with respect to a wavelength axis based on continuity of the spectrum contained in said rectangular spectrum light source input to said measured optical amplifier and slopes of the gain ($G_n$) and the noise figure ($NF_n$) at any desired wavelength can be found from the result.

17. The optical amplifier evaluation instrument of claim 12 wherein said rectangular spectrum light source is driven directly by an electric pulse signal to provide an input optical pulse signal.

18. The optical amplifier evaluation instrument of claim 12 wherein continous output light from said rectangular spectrum light source is allowed to pass through the first optical modulator to provide an optical pulse to an input of said measured optical amplifier.

19. The optical amplifier evaluation instrument of claim 12 wherein the second optical modulator is driven by a repetitive pulse signal synchronized with an optical pulse signal supplied to the measured optical amplifier to seperate the post-amplified signal light power ($P_{out\_n}$) and the amplified spontaneous emission power ($P_{ASE\_n}$) continuously output in time sequence from said measured optical amplifier.

20. The optical amplifier evaluation instrument of claim 12 wherein the light intensity measuring instrument measures the post-amplified signal light power ($P_{out\_n}$) and the amplified spontaneous emission power ($P_{ASE\_n}$) using a gate measuring function based on timing conducts measurement.

21. The optical amplifier evaluation instrument of claim 12 wherein the time as a width of the sampling window when said second optical modulator is turned on/off is shorter than the time during which said first optical modulator is on or off, and the relative phase relationship is such that an overlap exists in time periods preceding and following the sampling window of said second optical modulator when said first optical modulator is set for providing guard time.

22. The optical amplifier evaluation instrument of claim 12, wherein the measured optical amplifier comprises an optical fiber amplifier including a rare earth element and the modulation frequency of intensity modulation light is at least 10 kHz.

23. The optical amplifier evaluation instrument as claimed in claim 12 wherein the measured optical amplifier comprises a semiconductor optical amplifier and the modulation frequency of intensity modulation light is at least 1 GHz.

24. The optical amplifier evaluation instrument of claim 12 wherein said first optical modulator comprises an acousto-optic modulator.

25. The optical amplifier evaluation instrument of claim 24 wherein said second optical modulator comprises an acousto-optic modulator.

26. The optical amplifier evaluation instrument of claim 12 configured to conduct automatic measurements of the gain ($G_n$) and noise figure ($NF_n$).

* * * * *